(12) United States Patent
Mori et al.

(10) Patent No.: US 6,700,282 B2
(45) Date of Patent: Mar. 2, 2004

(54) ROTARY ELECTRIC MACHINE AND METHOD FOR CONNECTING STATOR CONDUCTORS

(75) Inventors: Yoshimi Mori, Mito (JP); Takashi Yasuhara, Yotsukaido (JP); Osamu Koizumi, Higashiibaraki (JP); Masaaki Hayashi, Hitachinaka (JP); Shinji Kikawa, Mito (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 10/283,273

(22) Filed: Oct. 30, 2002

(65) Prior Publication Data

US 2003/0127935 A1 Jul. 10, 2003

(30) Foreign Application Priority Data

Jan. 10, 2002 (JP) .......................... 2002-2915

(51) Int. Cl.⁷ ............................... H02K 3/04
(52) U.S. Cl. ..................... 310/208; 310/206; 310/201
(58) Field of Search ................. 310/208, 206, 310/201, 202, 200, 213, 214, 215

(56) References Cited

U.S. PATENT DOCUMENTS

| | | | | |
|---|---|---|---|---|
| 4,437,230 A | * | 3/1984 | Greutmann | |
| 5,955,810 A | * | 9/1999 | Umeda et al. | |
| 6,201,332 B1 | * | 3/2001 | Umeda et al. | |
| 6,204,586 B1 | * | 3/2001 | Umeda et al. | |
| 6,414,410 B1 | * | 7/2002 | Nakamura et al. | |
| 6,498,414 B2 | * | 12/2002 | Asao | |
| 6,507,137 B2 | * | 1/2003 | Asao et al. | |

* cited by examiner

Primary Examiner—Thanh Lam
(74) Attorney, Agent, or Firm—Crowell & Moring LLP

(57) ABSTRACT

A rotary electric machine having improved coil connection reliability, simplified coil end processing steps and improved workability based on an improved components mounting method is to be provided. Flat type conductors are inserted in a stacked state into each of slots formed in a stator core, and a side face of a preceding-stage winding terminal end and a side face of a succeeding-stage winding start end in the flat type conductors are lapped and connected to constitute an assembly of stator coils. The stator coil assembly comprises plural coil groups, and one electrode is connected to one conductor end in the coil groups, while another electrode is moved in a successive manner to connect preceding- and succeeding-stage winding terminal and start ends of the conductors. Further, an insulating ring with crossover conductors laid thereon is combined with such stator coil assembly to connect winding terminal and start ends of the stator coil assembly, thereby constituting a predetermined winding circuit.

7 Claims, 13 Drawing Sheets

ROTARY ELECTRIC MACHINE AND METHOD FOR CONNECTING STATOR CONDUCTORS

BACKGROUND OF THE INVENTION

The present invention relates to a rotary electric machine and a method for connecting stator conductors used therein.

As coils used in rotary electric machines there are known, for example, a concentrated winding type coil comprising flat type windings such as that disclosed in Japanese Patent Laid Open No. 2000-197294 and a coil wherein flat type conductors are mounted beforehand in a concentrated winding shape to a split core or an open slot core such as those disclosed in Japanese Patent Laid Open Nos. 10-66314 and 10-42528.

There also is known a lap winding type coil comprising flat type conductor windings such as those disclosed in Japanese Patent Laid Open Nos. 2000-350423 and 11-164506.

As a method for connecting coil tips there is known such a method as is disclosed in Japanese Patent Laid Open No. 2000-164043 in which coil tips are formed with flat portions and are connected together.

According to the above publications 2000-197294, 10-66314, and 10-42528, it is necessary that the core be divided in a concentrated winding method using flat type conductors, so there occur an increase of iron loss and a lowering of magnetic flux density, with consequent fear of a lowering in output of the rotary electric machine.

The structures disclosed in the above publications 2000-350423 and 11-164506 are open slot structures, which are disadvantageous to winding of flat type conductors.

SUMMARY OF THE INVENTION

A typical object of the present invention is to provide a rotary electric machine having a winding structure which is not restrained by a core shape.

A typical construction of the present invention is characteristic in the following rotary electric machine:

A rotary electric machine comprising a stator core and stator coils inserted into slots formed in the stator core, characterized in that flat type conductors preformed in U shape by molding are disposed in a stacked state within each of the slots of the stator core in such a manner that respective surfaces perpendicular to the radial direction of the stator core are wide surfaces, and side faces of preceding-stage winding terminal ends and side faces of succeeding-stage winding start ends of the flat type conductors, which are opposed to each other, are connected together in a lapped state to assemble the stator coils.

BRIEF DESCRIPTION OF THE DRAWINGS

Other objects and advantages of the invention will become apparent from the following description of embodiments with reference to the accompanying drawings in which.

DESCRIPTION OF THE PREFERRED EMBODIMENTS

A rotary electric machine according to a preferred embodiment of the present invention will be described in detail hereinunder with reference to the accompanying drawings.

Figure 1:
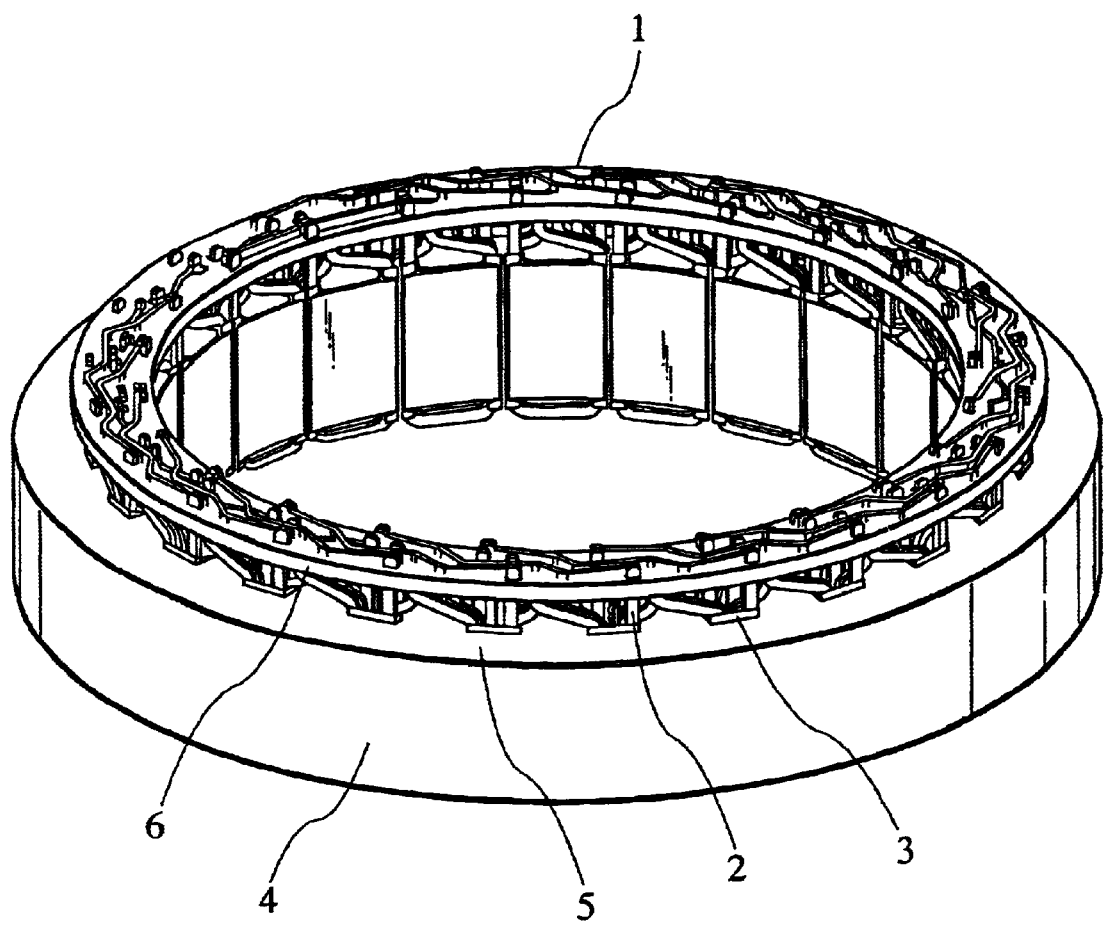
FIG. 1 is a perspective view of a stator in a rotary electric machine according to an embodiment of the present invention.
Figure 2:
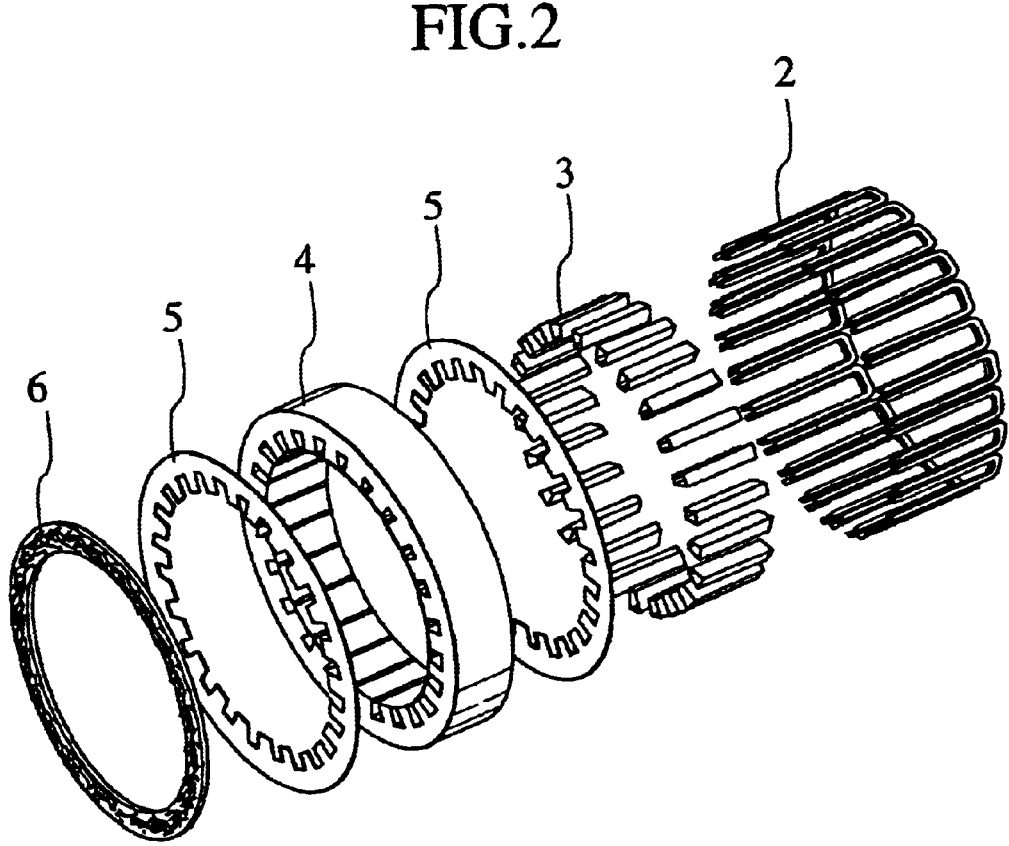
FIG. 2 is a developed diagram thereof.

FIG. 1 is a perspective view of a stator in the rotary electric machine and FIG. 2 is a developed diagram thereof. In both figures, a stator 1 comprises at least stator coils 2 formed by windings of flat type conductors, slot insulating tubes 3, a laminated stator core 4, reinforcing plates 5 positioned on side end faces of the stator core 4 to reinforce the stator core, and a crossover conductor ring 6 for gathering and connecting ends of the stator coils 2.

In the developed diagram of FIG. 2, the stator core 4 is formed by an integral laminate of many iron sheets, and twenty-four semi-closed slots 12 each having a partially open inside are formed inside the core at equal intervals in the circumferential direction. The slot insulating tubes 3 are axially inserted respectively into the twenty-four semi-closed slots 12. The slot insulating tubes 3 each have a shape such that recording paper having a thickness of t=0.18 mm comes into close contact with the whole inner periphery of each slot.

Figure 3:
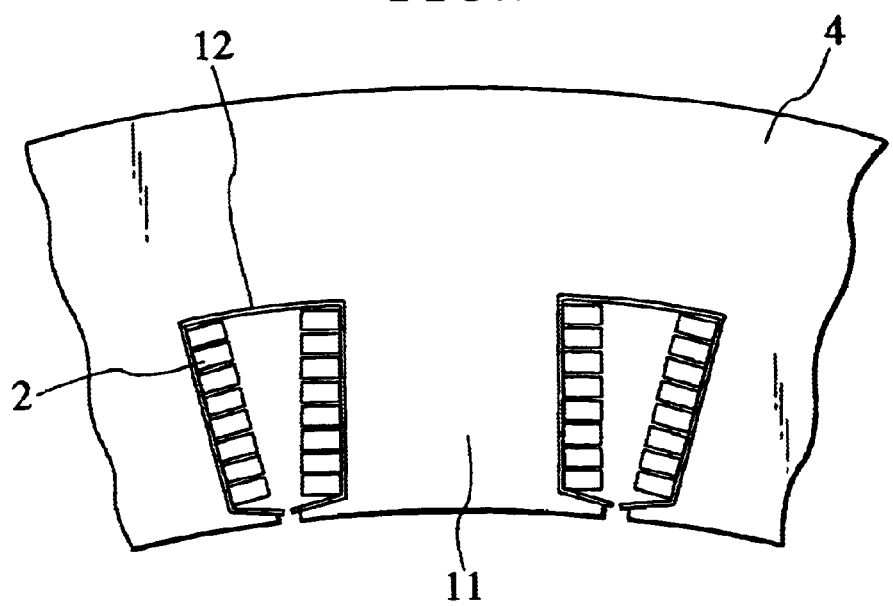
FIG. 3 is a partial sectional view of the stator.

As shown in FIG. 3, eight plate-like (flat type) stator coils 2 each pre-formed in U shape are laminated as one set and in this state are inserted into each of twenty-four slots 12. The slots 12 and teeth 11 of the stator core 4 are arranged in an alternate way.

After this insertion of the stator coils 2, end portions of the coils 2 are subjected a mechanical forming. As to the forming of the stator coils 2, a description will be given later in connection with FIG. 4 and subsequent drawings.

Next, the coil end portions, after the forming thereof, are connected electrically and mechanically to form a coil assembly. Also as to the method for connecting the stator coils 2, it will be described later in connection with FIG. 10 and subsequent drawings.

Then, a concentrated winding of 1Y connection can be constituted by mounting and connection of a crossover conductor ring 6 having inter-phase crossover conductors and neutral conductors.

FIG. 3 is a partial sectional view of the stator 1. In an inner periphery portion of the stator core 4 are arranged twenty-four slots 12 at equal intervals in the rotational direction. In each slot 12 are accommodated eight stator coils 2 in a state such that their wide surfaces are stacked surfaces with respect to the bottom of the slot.

Figure 4:
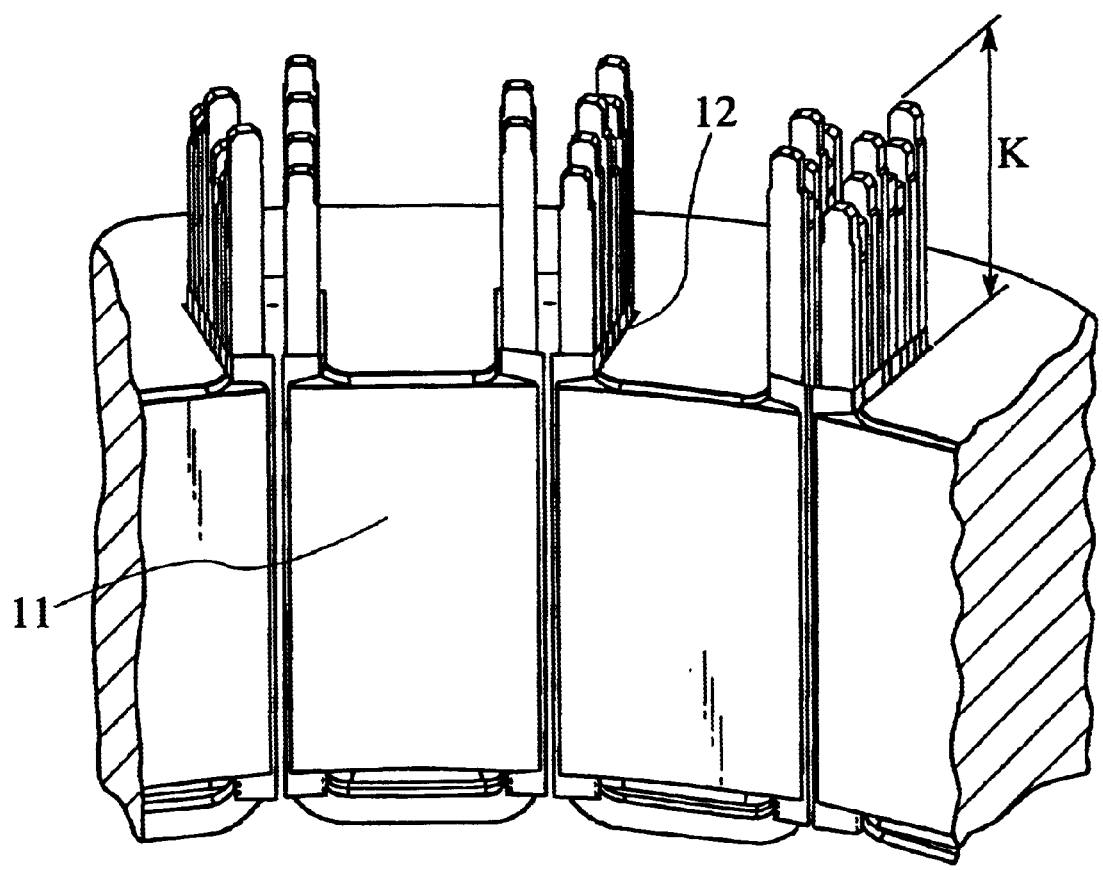
FIG. 4 is a partial perspective view after insertion of stator coils.

FIG. 4 shows a state after insertion of the stator coils 2. On both sides of each tooth 11 the stator coils 2 each pre-formed in U shape are inserted stackedly into slots so that eight stator coils as one set for each slot.

Projection sizes k of rectilinear portions at coil ends projecting from each slot 12 are determined at the time of pre-forming the stator coils 2 in U shape so that it is possible to match the heights of adjacent coil ends and connect the coil ends at the time of subjecting the coil ends to forming. These sizes are calculated at the stage of design.

Figure 5:
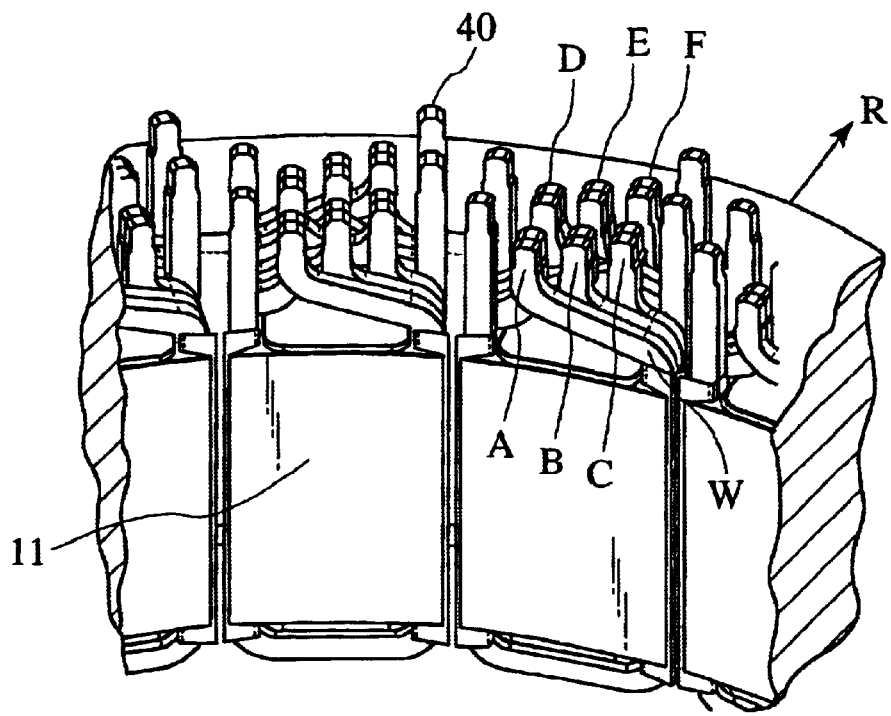
FIG. 5 is a partial perspective view after formation of stator coil ends.
Figure 6:
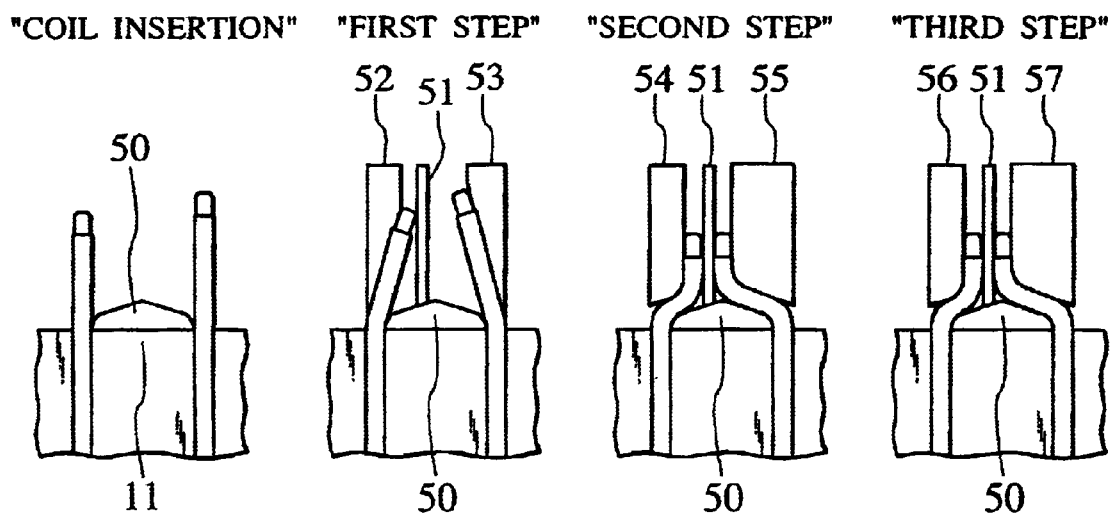
FIG. 6 is a diagram showing a forming step of forming stator coil ends.

FIG. 5 shows a state in which end portions of the stator coils 2 have been subjected to forming from the state of FIG. 4. Eight stator coils 2 are formed to constitute a coil assembly 40. As can be seen from the figure, the coil assembly 40 is in contact with another coil assembly adjacent thereto in the circumferential direction. As shown in FIG. 6, a forming tool can be operated from above and within the width of each tooth 11. Actually, coil ends can be subjected to forming in three steps.

FIG. 6 shows through what steps the coil ends are subjected to forming. Prior to forming, first in a pre-step "Coil Insertion," stator coils 2 are inserted into each slot 12, and thereafter a bending guide 50 which undergoes a forming load is disposed on an upper surface of the tooth 11.

Subsequently, in "First Step," an insulating plate for ensuring an insulating space between coils is disposed from above, then partition bars 52 and 53 are set to ensure a space necessary for forming in second and third steps, and with the partition bars 52 and 53, forming is performed in a state in which the rectilinear portions of the coils ends are brought down inwards.

Next, in "Second Step," the partition bars 52 and 53 used in the first step are removed and instead there are set R bars 54 and 55 each having a bending portion of a large radius R, then a rough forming is performed with the R bars 54 and 55.

Then, in "Third Step," the R bars 54 and 55 are removed and instead are set forming bars 56 and 57, then coil ends are restrained by the bending guide 50, partition plate 51, and forming bars 56, 57 to permit the execution of a highly accurate forming. Through a series of these forming operations, eight laminated coils, as one phase of coils, are subjected to forming simultaneously.

Next, a more detailed description will be given below about the construction of the coil assembly 40 before and after insertion thereof into each slot 12.

Figure 7:
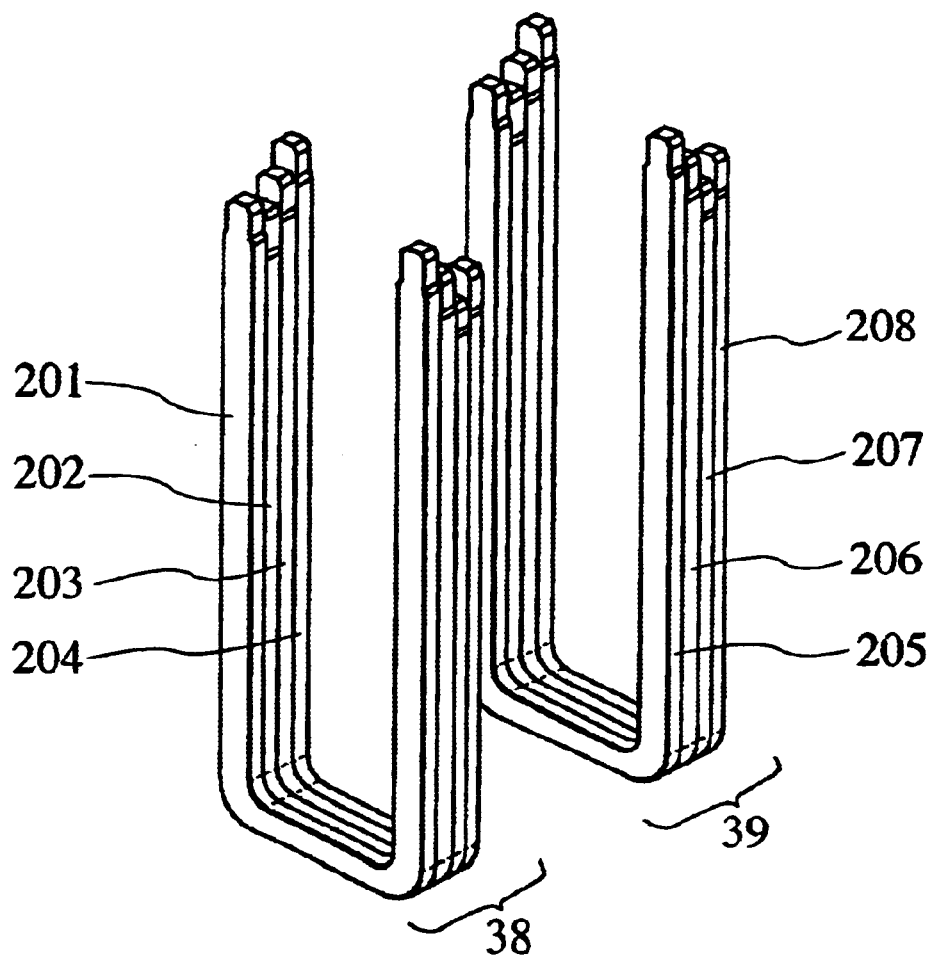
FIG. 7 is a perspective view showing a state before forming of a coil assembly.

FIG. 7 shows a state before subjecting the coil assembly 40 to forming. The coil assembly 40 is divided to a coil group 38 comprising four U-shaped coils 201, 202, 203, 204, which are laminated together, and a coil group 39 comprising four U-shaped coils 205, 206, 207, 208, which are also laminated together.

Figure 8:
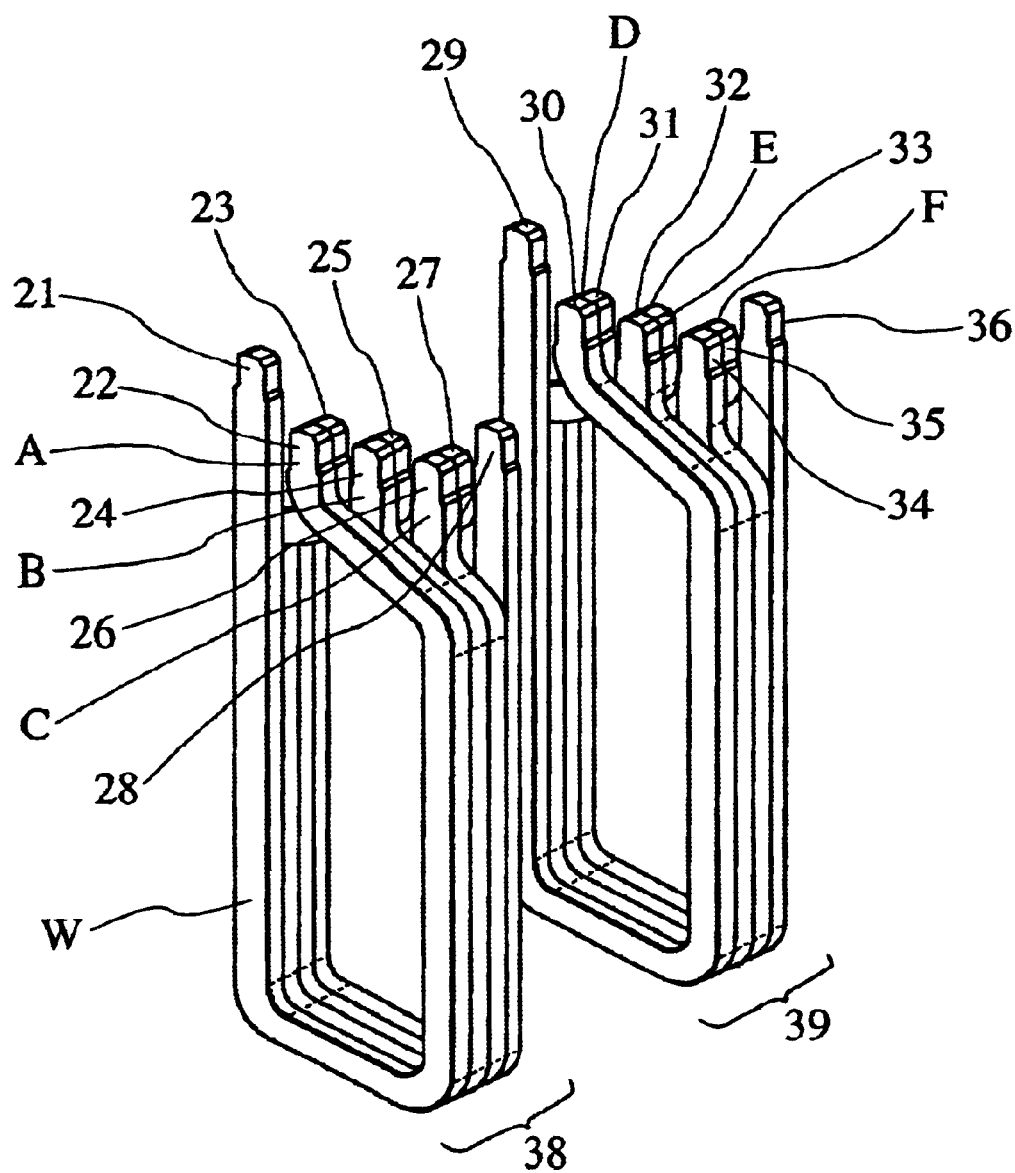
FIG. 8 is a perspective view showing a state after forming of the coil assembly.

FIG. 8 shows a state after forming of the coil assembly 40, which forming has been performed by the method illustrated in FIG. 6.

In the figures, a winding start end 21 of the U-shaped coil 201 is a rectilinear portion, and in accordance with the method shown in FIG. 6 a winding terminal end 22 is formed to a posture parallel to the winding start end 21 while ensuring an insulating space in the direction of the winding start end 21. In this case the forming is performed using the bars 53, 55, and 57 shown on the right-hand side in FIG. 6.

Next, a winding start end 23 of the U-shaped coil 202 adjacent to the winding start end 21 of the U-shaped coil 201 is formed to a position coincident with a side face of the winding terminal end 22 of the coil 201, and a winding end 24 of the coil 202 is formed to a posture parallel to the winding start end 23 of the coil 202 while ensuring an insulating space in the direction of the winding start end 23 of the coil 202. In this case the forming is performed using the bars 52, 53, 54, 55, 56, and 57 shown in FIG. 6.

Then, a winding start end 25 of the U-shaped coil 203 adjacent to the winding start end 23 of the U-shaped coil 202 is formed to a position coincident with a side face of the winding terminal end 24 of the U-shaped coil 202.

A winding terminal end 26 of the U-shaped coil 203 is formed to a posture parallel to the winding start end 25 of the U-shaped coil 203 while ensuring an insulating space in the direction of the winding start end 25 of the coil 203.

Further, a winding start end 27 of the U-shaped coil 204 adjacent to the winding start end 25 of the U-shaped coil 203 is formed to a position coincident with a side face of the winding terminal end 26 of the coil 203.

A winding terminal end 28 of the U-shaped coil 204 is a rectilinear portion and in this case the forming is performed using the bars 52, 54, and 56 shown on the left-hand side in FIG. 6.

Thus, within the width of each tooth 11 and at a position at which a side face of a preceding-stage winding terminal end and a side face of a succeeding-stage winding start end coincide with each other, forming, which is offset successively in the rotational direction, is repeated while leaving a space capable of ensuring an insulating space between the winding terminal and start ends, thereby constituting a coil group 38 wherein the winding terminal end 28 is a rectilinear portion.

A stator coil group 39 is also formed in the same way. That is, a winding start end 29 of a stator coil is a rectilinear portion, and winding terminal and start ends of adjacent stator coils, i.e., a winding terminal end 30 and a winding start end 31, a winding terminal end 32 and a winding start end 33, a winding terminal end 34 and a winding start end 35, are subjected to forming repeatedly in a successively offset manner in the rotational direction while leaving a space capable of ensuring an insulating space, to constitute a coil group 39 wherein a winding terminal end 36 is a rectilinear portion.

Figure 9:
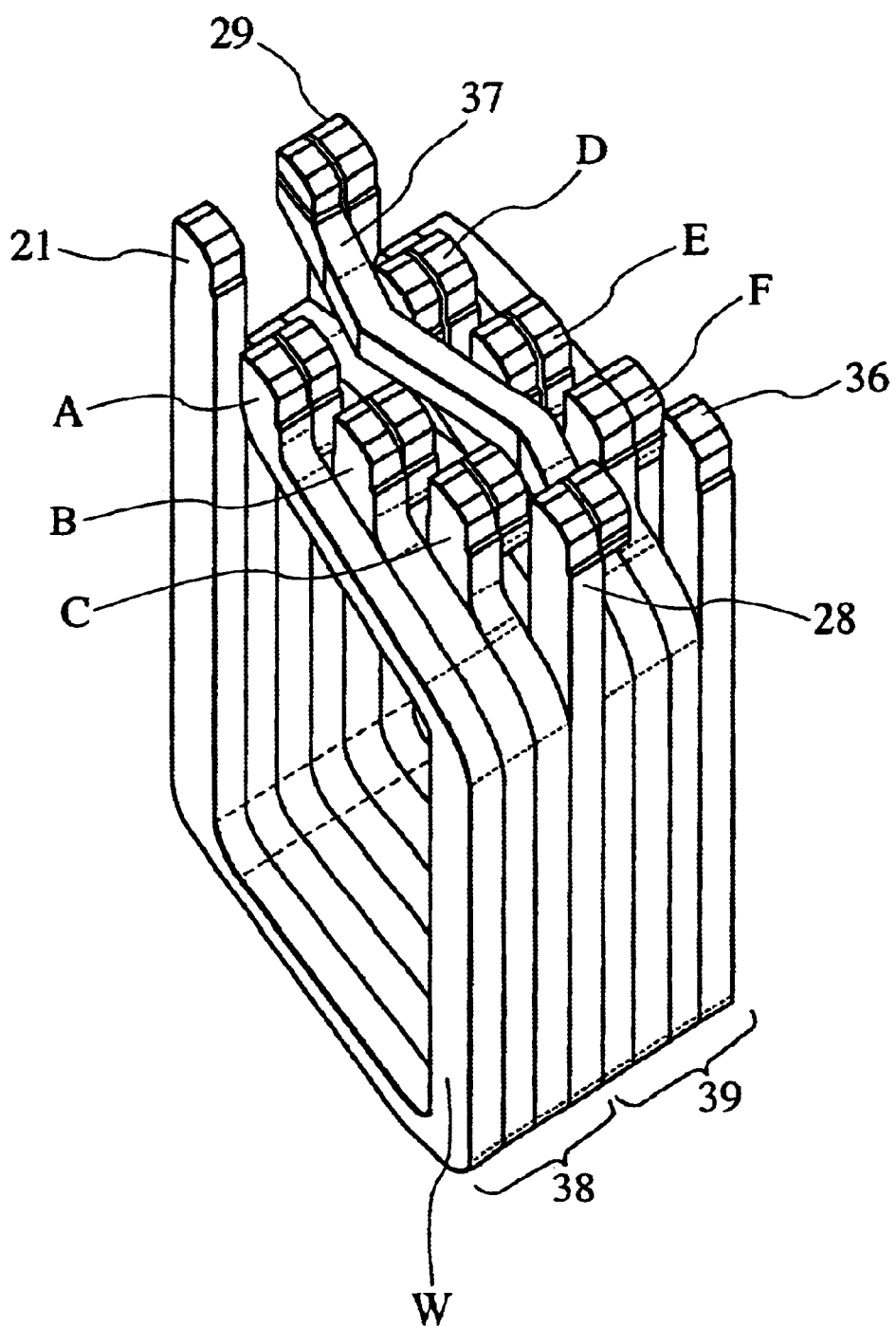
FIG. 9 is a perspective view showing a connected state of a one-phase coil assembly.

FIG. 9 shows a state of a one-phase coil assembly. If the winding terminal end 28 of the preceding-stage coil group 38 and the winding start end 29 of the succeeding-stage coil group 39 are connected together through a crossover conductor 37 in a shape such that side faces of the ends coincide with each other, there is constituted a one-phase coil assembly 41 including two coil groups beginning with the winding start end 21 and ending in the winding terminal end 36.

The crossover conductor 37 is built in the crossover conductor ring 6 and the aforesaid connection is made after mounting the crossover conductor ring 6 has been mounted to the stator core with coils groups built therein.

In this embodiment, twenty-four preceding-stage coil assemblies 40 are arranged alternately with teeth 11 which are equally divided to twenty-four in the inner periphery direction of the stator core 4.

In this embodiment, since the number of stator coils stacked in each slot is eight, four stacked U-shaped coils are used as one coil group and there are adopted three positions in each of which a side face of a preceding-stage winding terminal end and that of a succeeding-stage winding start end coincide with each other. An eight-coil assembly is constituted by connecting two coil groups through the crossover conductor.

Thus, each stator coil assembly is composed of plural coil groups, and by connecting a winding start end and a winding terminal end in the respective groups through the crossover conductor it is possible to constitute an assembly of n number (n is a natural number) of stacked stator coils.

Further, the number of stator coils which are stacked so as to give three coincident positions of side faces of coil ends is 4n (n is a natural number). In case of such positions being four, the number of such stator coils is 5n. Likewise, in case of five such positions, the number of such stator coils is 6n.

As is seen from FIGS. 5, 8, and 9, flat type conductors pre-formed in U shape are stacked within each slot 12 formed in the stator core 4 in such a manner that their surfaces perpendicular to the radial direction R of the stator core 4 are wide surfaces W, thereby disposing at least two coils groups 38 and 39.

In the stator coil 38, a connection A between the winding terminal end 22 of the U-shaped coil 201 and the winding start end 23 of the U-shaped coil 202, a connection B between the winding terminal end 24 of the U-shaped coil 202 and the winding start end 25 of the U-shaped coil 203, and a connection C between the winding terminal end 26 of the U-shaped coil 203 and the winding start end 27 of the U-shaped coil 204, are formed in an offset state so as to ensure a sufficient distance for insulation from one another, that is, for preventing an overlap of those ends. In other words, the connections A, B, and C are formed so as to be offset from one another by a predetermined distance in a rotational direction.

Also in the stator coil group 39, a connection D between the winding terminal end 30 of the U-shaped coil 205 and the winding start end 31 of the U-shaped coil 206, a connection E between the winding terminal end 32 of the U-shaped coil 206 and the winding start end 33 of the U-shaped coil 207, and a connection F between the winding terminal end 34 of the U-shaped coil 207 and the winding start end 35 of the U-shaped coil 208, are formed in an offset state so as to ensure a sufficient distance for insulation from one another, that is, for preventing an overlap of those ends.

The connections in the stator coil groups 38 and 39 are formed so that the connections A and D, the connections B and E, and the connections E and C, are respectively positioned on substantially the same direction lines radially and occupy substantially the same positions respectively and so that the distance between the connections A and D, the distance between the connections B and E, and the distance between the connections C and F, are almost equal.

Figure 10:
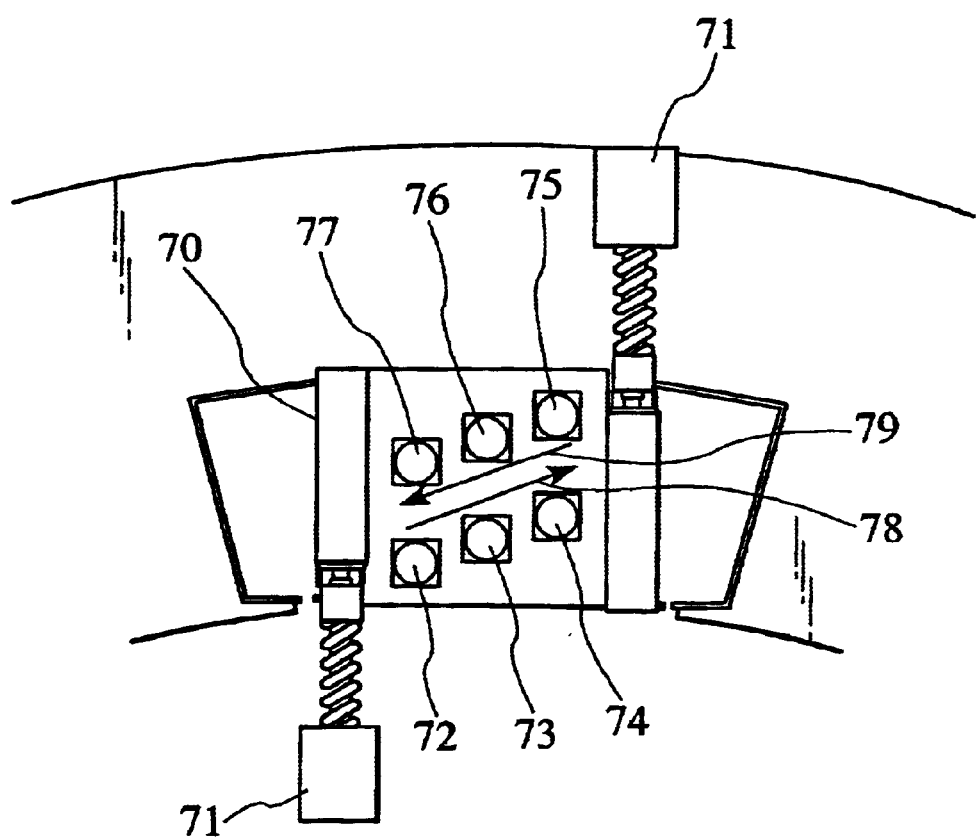
FIG. 10 is a diagram explaining a connected state of the coil assembly.

FIG. 10 shows a connecting method for the coil assembly 40. In connecting coils at the connections A, B, C, D, E, and F, if there are used stator coils each having a flat section size of 2.4 mm×4.5 mm, the length to width ratio becomes approximately 1:2, and if side faces of such coils are abutted against each other, there is formed a coil connection which is generally square in shape of 4.8 mm×4.5 mm.

Then, a coil positioning guide 70 is inserted from above to fix the connections A, B, C, D, E, and F, the coil positioning guide 70 having generally square holes formed in positions and sizes corresponding to the connections A, B, C, D, E, and F which positions correspond to the positions of reference numerals 72, 73, 74, 75, 76, and 77).

When looking from above, melted portions can be received within a circular and generally square shape, so with the positioning guide 70 of a simple shape it is possible to fix the connections A, B, C, D, E, and F.

For connecting coil ends it is preferable to use TIG welding. More specifically, a (+) electrode 71 is fixed to the winding start end 21 of the coil group 38, and for the connecting positions 72, 73, and 74 in which side faces of preceding-stage winding terminal ends and side faces of succeeding-stage winding start ends are lapped together, a torch is moved along a torch path 78 to connect coil ends by a continuous operation.

Likewise, a (+) electrode 71 is fixed to the winding terminal end 36 of the coil group 39, and for the connecting positions 75, 76, and 77 in which side faces preceding-stage winding terminal ends and side faces of succeeding-stage winding start ends are lapped together, a torch is moved along a torch path 79 to connect coil ends by a continuous operation.

Actually, (+) electrodes 71 are fixed to two hundred and eleven winding start ends, but once the connecting position 72 is connected, a conducting state is created from the winding start end 21 which is in contact with (+) electrode 71 up to the connecting position 73, and upon connection of the connecting position 73 the conducting state reaches the connecting position 74. Consequently, with (+) electrode 71 fixed and by moving the torch, it is possible to effect connection by a continuous operation.

Figure 11:
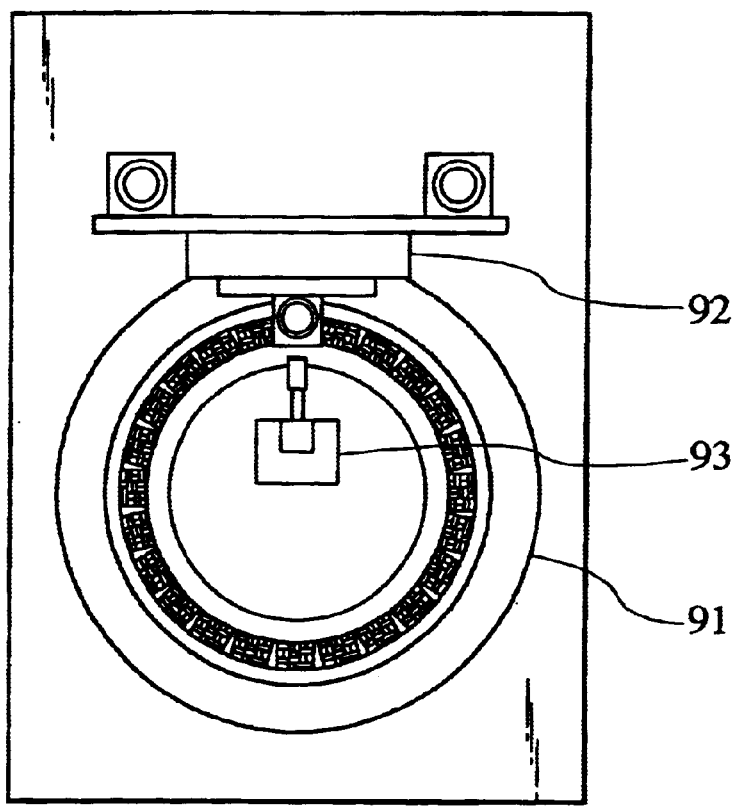
FIG. 11 is a top view of a coil connector.

FIG. 11 is a top view of a coil connector used in the above coil connection. The coil connector comprises an index section 91 for performing operation for each coil group, a torch slide section 92 for connecting coil ends continuously by TIG welding, and a (+) electrode fixing section 93.

In FIG. 11, the stator 1 is disposed in a direction in which stator coil ends lie on the upper side centrally of the index section 91, the coil groups arranged at equal intervals in the rotational direction are welded by TIG welding, and indexing is repeated to effect connection. At the same time, an electric current fed in the TIG welding is measured to make sure that the connection is effected. As the coil connector there may be used a known coil connector after an improvement is made thereto.

Figure 12:
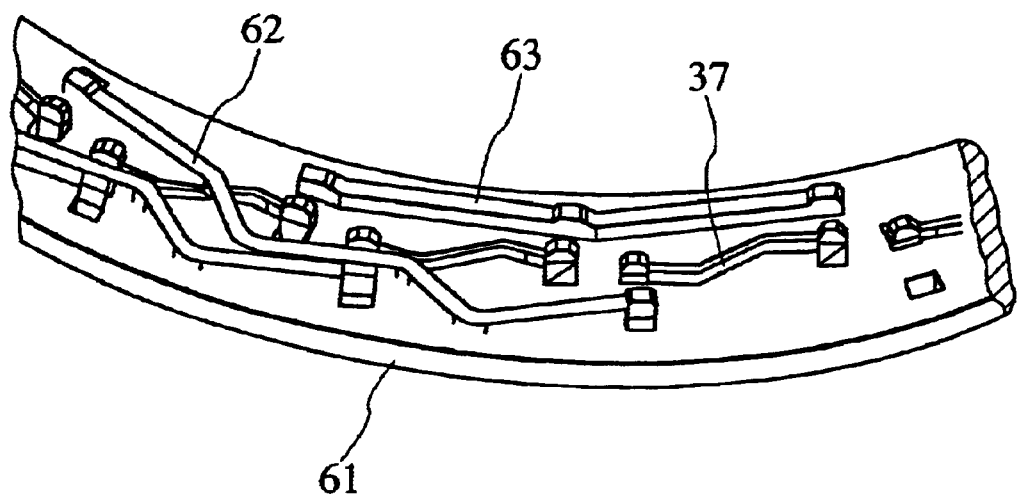
FIG. 12 is a partial perspective view of a surface of a crossover conductor ring.

FIG. 12 is a partial perspective view showing the surface of the crossover conductor ring 6. A ring 61 is formed of an insulating material, and on the surface thereof are arranged twenty-one inter-phase crossover conductors 62 and neutral conductors 63, as well as twenty-four crossover conductors 37.

Figure 13:
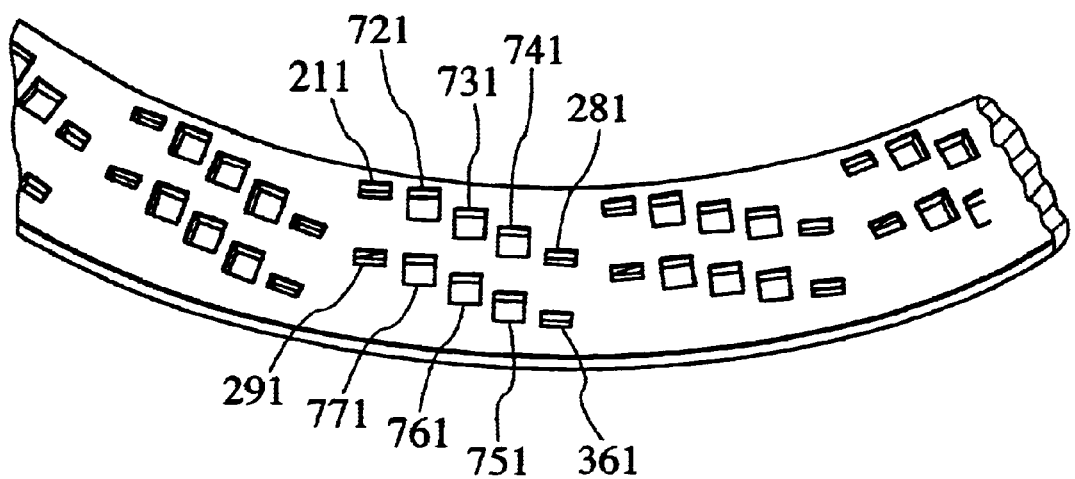
FIG. 13 is a partial perspective view of a back side of the crossover conductor ring.

FIG. 13 is a partial perspective view showing the back side of the crossover conductor ring 6. In the back side of the crossover conductor ring 6 are formed insulating holes 721, 731, 741, 751, 761, and 771 for ensuring insulation of the connections A, B, C, D, E, and F at the connecting positions 72, 73, 74, 75, 76, and 77 of the coil assembly 40 shown in FIG. 10. Also formed in the back side of the crossover conductor ring 6 are through holes 211, 281, 291, and 361 for positioning the rectilinear portions 21, 28, 29, and 36 which are winding start and terminal end portions shown in FIG. 9.

Figure 14:
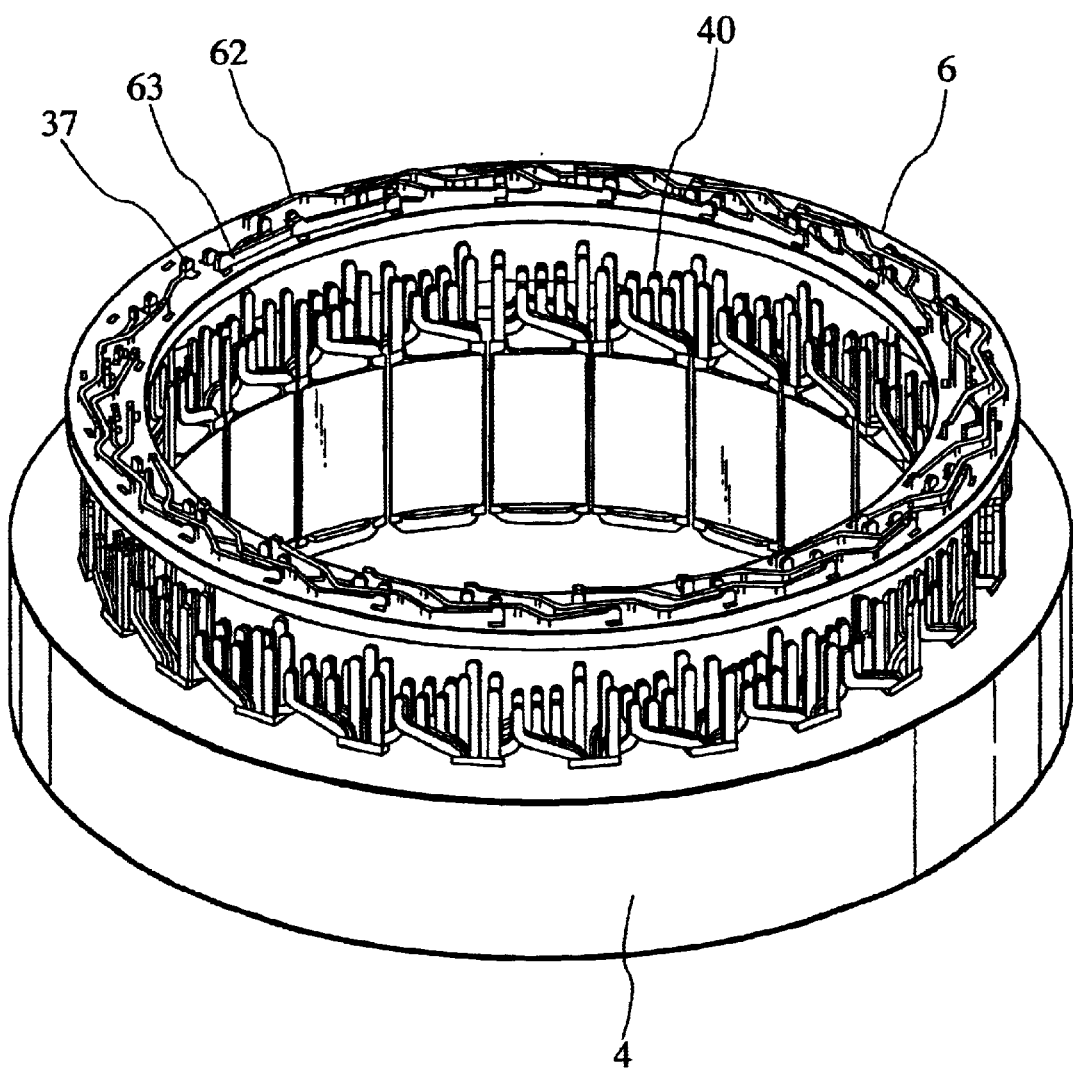
FIG. 14 is a diagram showing a mounted state of the crossover conductor ring.

FIG. 14 illustrates a mounted state of the crossover conductor ring 6. The ring 6 is mounted from above to effect insulation of the connections at the connecting positions 72, 73, 74, 75, 76, and 77 of the coil assembly 40 and effect positioning of the rectilinear portions 21, 28, 29, and 36.

The inter-phase crossover conductors 62, neutral conductors 63, and crossover conductors 37 have an end shape coincident with end side faces of the rectilinear portions 21, 28, 29, and 36 of the stator coil shown in FIG. 9, and by TIG welding after mounting there is constituted a concentrated winding of 1Y.

Figure 15:
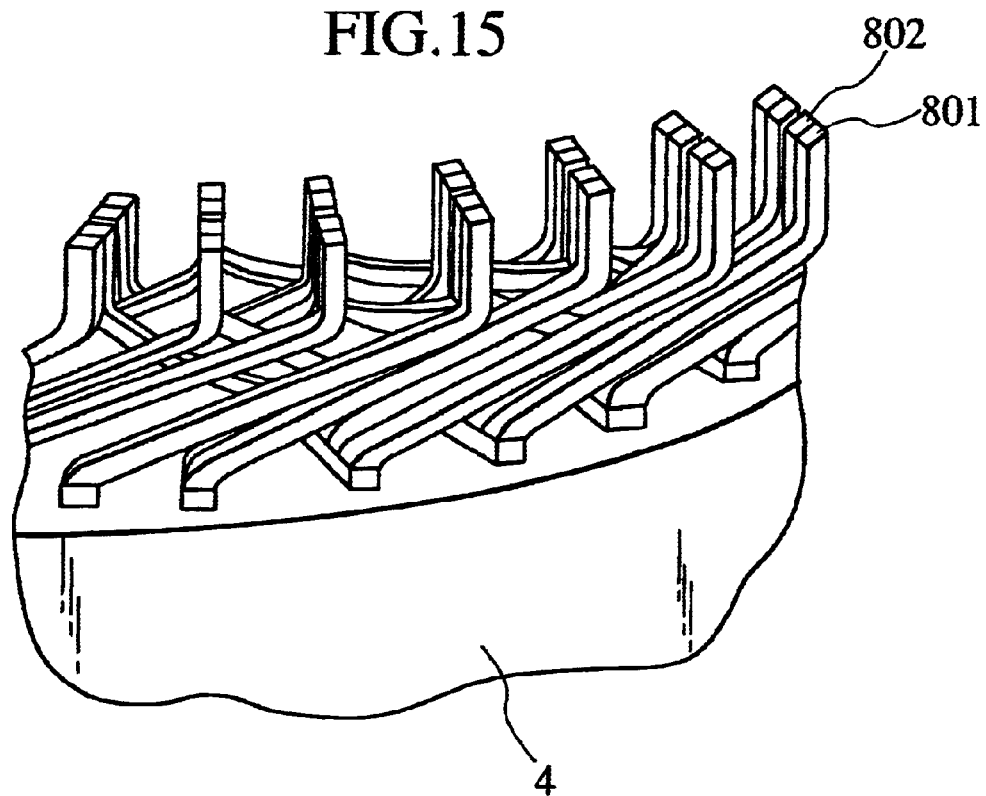
FIG. 15 is a partial perspective view showing a state before connection of lap winding ends.

FIG. 15 shows a state before connection of lap winding coil ends. Stator coils are received in each slot in a state in which wide surfaces of the coils are stacked surfaces with respect to the bottom of the slot, and in this state forming is performed so that a side face 801 of a preceding-stage winding terminal end and a side face 802 of a succeeding-stage winding start end coincide with each other, followed by connection, whereby it is possible to constitute a lap winding.

For example, also in the lap winding described in Japanese Patent Laid Open No. 2000-350423, coil tips are twisted 90° and forming is performed so that a side face of a preceding-stage winding terminal end and a side face of a succeeding-stage winding start end coincide with each other, whereby there can be attained a connection of a high positional tolerance.

In the above embodiment reference has been made to processing terminal conductors in a rotary electric machine which uses flat type conductors, but in a relatively small-sized electric device using round or flat type conductors, terminal conductors may be bundled into a circular form and be welded in this form.

Figure 16:
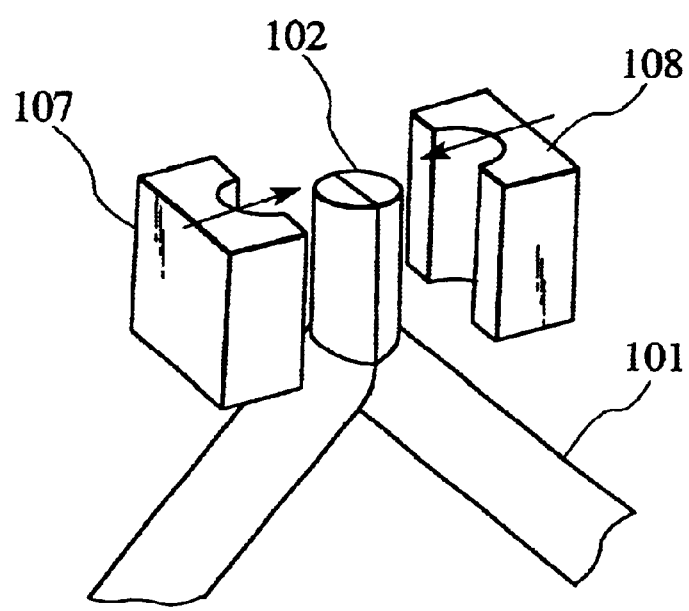
FIG. 16 is a perspective view showing a detailed shape of a round conductor for connection.

FIG. 16 shows a state of a terminal connection of a round conductor 101. A melted portion in spot welding assumes a circular shape under surface tension, so a connection 102 is formed circularly with forming dies 107 and 108.

By forming the connection in a circular shape it is possible to decrease a lack of penetration in a welded portion. For minimizing the resistance of each conductor connection it is necessary to conduct forming so that the sectional area of the connection 102 is equal to or larger than the sectional area of the conductor 101. The shape of this terminal connection is suitable for use in an electric device in which round conductors are connected.

Figure 17:
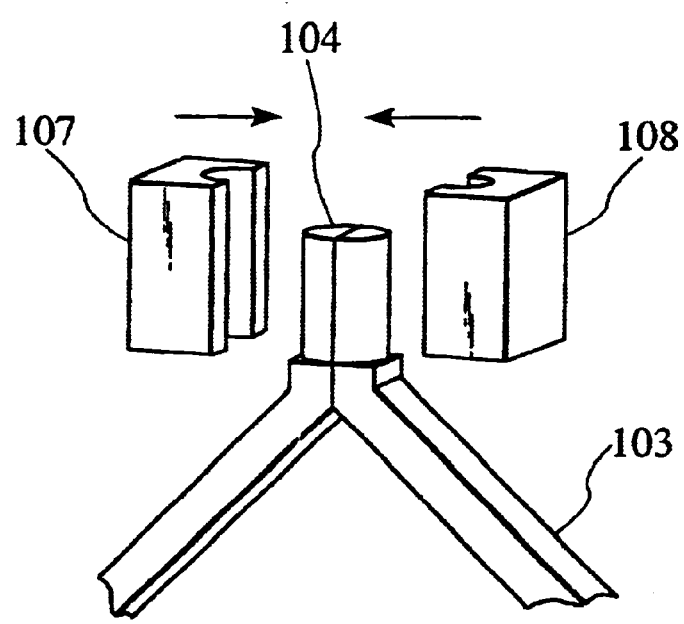
FIG. 17 is a perspective view showing a detailed shape of a flat type conductor for connection.
Figure 18:
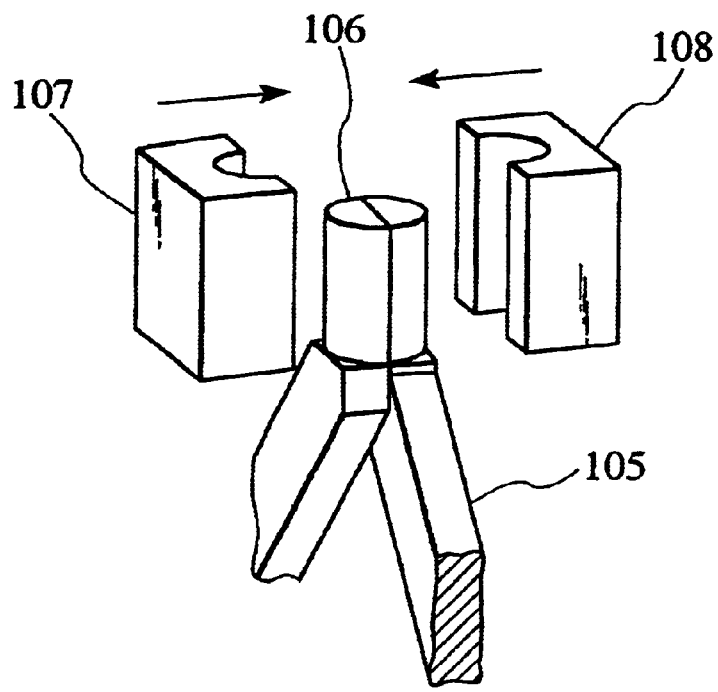
FIG. 18 is a perspective view showing a detailed shape of a flat type conductor for connection.

FIG. 17 shows a state of a flat conductor terminal connection and FIG. 18 shows a state of another flat conductor terminal connection.

Since a welded portion in spot welding assumes a circular shape, connections 104 and 106 are formed into a circular shape by means of forming dies 107 and 108. By forming the connections circularly it is possible to decrease a lack of penetration in the welding portion. For minimizing the resistance of the conductor connections it is necessary to conduct forming so that the connections 104 and 106 are equal to or larger than the conductors 103 and 105 in sectional area.

Thus, according to these examples, a side face of a preceding-stage winding terminal end and a side face of a succeeding-stage winding start end in laminated coils are connected together in a lapped state, whereby there are attained such effects a high connecting position tolerance, improved connection reliability, simplified terminal processing, and reduction in the number of working steps based on the crossover conducting ring mounting work.

According to the above embodiment of the present invention, flat type conductors pre-formed in U shape are inserted into each of slots formed in a stator core in such a manner that wide surfaces of the conductors are stacked surfaces with respect to the bottom of the slot, a side face of a preceding-stage winding terminal end and a side face of a succeeding-stage winding start end in the flat type conductors are connected together in a lapped state to constitute a stator coil assembly. Therefore, it is possible to provide a rotary electric machine having a winging structure not restricted by the shape of core.

Moreover, since the rotary electric machine has a stator coil assembly with preceding- and succeeding-stage winding terminal and start ends inserted and connected to an insulating ring having pre-laid crossover conductors, it is possible to simplify the terminal processing work and the rotary electric machine exhibits a high assembling work efficiency. Since the length to width ratio of the flat type conductors is set at approximately 1:2, it is possible to provide a rotary electric machine having a high positional tolerance in connection.

Moreover, the stator coil assembly comprises plural coil groups and the respective winding start and terminal ends are positioned projectingly in the winding direction and are connected through crossover conductors, whereby it is possible to provide a rotary electric machine of a simple structure and exhibiting a high assembling work efficiency.

Further, since the connecting positions of winding start and terminal ends in the coil groups are offset successively in the rotational direction, an insulating space can be taken wide and hence it is possible to provide a rotary electric machine having a high dielectric strength.

Further, since the insulating ring is a crossover conductor ring having inter-phase crossover conductors and neutral conductors and through which there are connected the aforesaid winding terminal and start ends, it is possible to provide a rotary electric machine having a higher positional tolerance.

Further, by fixing one electrode to one conductor end in coil groups and by moving another electrode successively to connect preceding- and succeeding-stage terminal and start ends of the conductors, it is possible to improve the connecting work efficiency.

Further, by lapping plural conductor ends into a circular shape, followed by spot welding, it is possible to provide a connecting conductor having a high positional tolerance.

According to a mode of the present invention, there is provided a rotary electric machine comprising: a stator core; and stator coils inserted into slots formed in the stator core; wherein flat type conductors pre-formed in U shape by molding are disposed in a stacked state within each of the slots of said stator core in such a manner that respective surfaces perpendicular to the radial direction of the stator core are wide surfaces, side faces of preceding-stage winding terminal ends and side faces of succeeding-stage winding start ends of said flat type conductors, which ends are opposed to each other, are connected together in a lapped state to constitute two coils within each said slot, an insulating ring with crossover conductors laid thereon in advance is mounted to said stator core, and the winding terminal end of one said coil and the winding start end of the other coil are connected together through the associated one of said crossover conductors.

According to another mode of the present embodiment, there is provided a method for connecting stator conductors, wherein a plurality of unconnected conductors are disposed within each of slots formed in a stator core, and one electrode is fixed to a winding start end of said conductors, while another electrode is moved in a successive manner to connect a preceding-stage winding terminal end and a succeeding-stage winding start end of said conductors with each other by conductive heating.

According to still another mode of the present embodiment, there is provided a method for connecting stator conductors, wherein flat type conductors pre-formed in U shape by molding are disposed in a stacked state within each of slots formed in a stator core in such a manner that respective surfaces perpendicular to the radial direction of the stator core are wide surfaces, and one electrode is fixed to a winding start end of said flat type conductors, while another electrode is moved in a successive manner to connect a preceding-stage winding terminal end and a succeeding-stage winding start end of the flat type conductors with each other by conductive heating.

According to another mode of the present embodiment, there is provided a rotary electric machine, wherein insulating ring is a crossover conductor ring with inter-phase crossover conductors and neutral conductors laid thereon, and the winding terminal end and the winding start end, both extending through said crossover conductor, are connected together through the associated one of crossover conductors.

A typical effect of the present invention is that there can be provided a rotary electric machine having a winding structure not restricted by the core shape.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A rotary electric machine comprising:

a stator core; and stator coils inserted into slots formed in the stator core;

wherein flat type conductors pre-formed in U shape by molding are disposed in a stacked state within each of the slots of said stator core in such a manner that respective surfaces perpendicular to the radial direction of the stator core are wide surfaces, and side faces of preceding-stage winding terminal ends and side faces of succeeding-stage winding start ends of said flat type conductors, which ends are opposed to each other, are connected together in a lapped state to assemble the stator coils.

2. A rotary electric machine according to claim 1, wherein said stator coils each comprising:

a plurality of coils and a winding start end and a winding terminal end of each of the coils are projected in the axial direction of said stator core and are connected together through a crossover conductor.

3. A rotary electric machine according to claim 1, wherein the connections are formed so as to be offset from one another by a predetermined distance in a rotational direction.

4. A rotary electric machine comprising:

a stator core; and stator coils inserted into slots formed in the stator core;

wherein flat type conductors pre-formed in U shape by molding are disposed in a stacked state within each of the slots of said stator core in such a manner that respective surfaces perpendicular to the radial direction of the stator core are wide surfaces, to constitute at least two coils disposed within each said slot, and side faces of preceding-stage winding terminal ends and side faces of succeeding-stage winding start ends of said flat type conductors, which ends are opposed to each other, are connected together in a lapped state so that the connections formed successively toward the outer periphery side of the stator core are offset from each other by a predetermined distance in a rotational direction.

5. A rotary electric machine according to claim 4, wherein the connections formed in said two coils are positioned substantially on the same direction line when looking in the radial direction in a mutually opposed state of the two coils, and the distance between the opposed connections is set substantially equal.

6. A method for connecting stator conductors, wherein a plurality of unconnected conductors are disposed within each of slots formed in a stator core, and a preceding-stage winding terminal end and a succeeding-stage winding start end of said plural conductors are bundled and formed into a circular shape, then connected together by welding.

7. A method for connecting stator conductors according to claim 6, wherein a sectional area of said conductors formed in a circular shape is equal to or larger than the total sectional area of the bundled conductors.

* * * * *